(12) United States Patent
Petersen

(10) Patent No.: US 6,715,715 B1
(45) Date of Patent: Apr. 6, 2004

(54) WATERPROOF COUNTERWEIGHTED PIT LID

(75) Inventor: Craig Petersen, Costa Mesa, CA (US)

(73) Assignee: Craig A. Petersen, Costa Mesa, CA (US)

( * ) Notice: Subject to any disclaimer, the term of this patent is extended or adjusted under 35 U.S.C. 154(b) by 0 days.

(21) Appl. No.: 10/618,346

(22) Filed: Jul. 14, 2003

(51) Int. Cl.[7] .................................................. B64F 1/00
(52) U.S. Cl. ..................... 244/114 R; 220/334; 16/289; 49/379; 49/371; 49/381; 49/387; 49/398
(58) Field of Search ...................... 244/114 R; 220/334, 220/567.1, 315; 16/18, 289, 221; 49/379, 371, 381, 387, 398

(56) References Cited

U.S. PATENT DOCUMENTS

| | | | |
|---|---|---|---|
| 4,467,932 A | | 8/1984 | Dabich .......................... 220/18 |
| 4,535,908 A | * | 8/1985 | Dabich .......................... 220/484 |
| 5,465,862 A | * | 11/1995 | Devlin .......................... 220/830 |
| 5,950,368 A | | 9/1999 | Bradford .......................... 52/20 |
| 6,041,553 A | * | 3/2000 | Joyce et al. .................. 49/504 |

* cited by examiner

Primary Examiner—J. Woodrow Eldred
(74) Attorney, Agent, or Firm—Charles H. Thomas

(57) ABSTRACT

An aircraft servicing pit that defines a subsurface chamber below a surface across which aircraft travel when not airborne is formed of a prefabricated pit body atop which a pit lid is mounted for rotation. Within the enclosure of the pit beneath the surface across which the aircraft travel a counterweight system is connected by gears to pit lid supporting arms. The pit lid supporting arms have proximal ends rigidly joined to pit lid gears, which are meshed with counterweight gears rigidly joined to counterweight arms supporting counterweights within the enclosure of the pit. The pit lid and counterweight arms move in counterrotation when the pit lid is opened and closed, with the gravitational force acting upon the counterweights acting in opposition to the force of gravity upon the pit lid. By locating the lid hinge axis of rotation beneath the rim of the frame in which the pit lid is seated when closed, it is possible to provide the pit lid with a resilient gasket extending about its entire peripheral edge. Consequently, an aircraft servicing pit is provided which has a counterbalanced pit lid that may be sealed watertight within a surrounding frame.

16 Claims, 4 Drawing Sheets

WATERPROOF COUNTERWEIGHTED PIT LID

BACKGROUND OF THE INVENTION

1. Field of the Invention

The present invention relates to a self-sealing gravity assisted pit lid mounting system for an access lid to a subsurface chamber for servicing aircraft.

2. Description of the Prior Art

At modern aircraft terminals the servicing of aircraft on the ground is frequently performed using subsurface pits, which are often prefabricated structures. Such aircraft servicing pits are installed at aircraft docking, fueling, and loading areas beneath the surface of the tarmac across which aircraft travel during docking and departure maneuvers. The pits forming a subsurface chamber are typically constructed of fiberglass, steel, concrete, or aluminum. These pits are typically fabricated as complete enclosures with surrounding walls, a floor, and an access lid at the top seated within a frame disposed at the mouth of the prefabricated pit. When the lid is closed it lies substantially flush with the surface of the tarmac. Such pits are installed below the surface of loading and refueling aprons at aircraft terminals, remote parking locations, and aircraft maintenance bases.

The purpose of such pits is to allow ground support functions to be carried out from subsurface enclosures. These ground support functions include the provision of fuel, the provision of electricity to the aircraft while it is in the docking area, the provision of air for cooling the aircraft interior, the provision of pressurized air for starting the aircraft engines, and for other aircraft support activities on the ground. The use of subsurface pits eliminates the need for mobile trucks, carts, and other vehicles which are otherwise necessarily present in the loading area and which interfere with the arrival and departure of aircraft in the vicinity of a loading gate.

The use of subsurface pits also allows the provision of fuel, power, cooling and pressurized air, and other supplies from a central location. The necessary fluid supplies and electrical power can be generated or stored with greater efficiency at a central location, as contrasted with mobile generating or supply vehicles.

The pits located below the aircraft terminal area house valves, junction boxes, cooling air terminations, and other terminal equipment that is temporarily connected to an aircraft that has been docked. Umbilical pipes and lines, otherwise housed within the pits, are withdrawn from them through hatches therein and are coupled to a docked aircraft to supply it with fuel, air for cooling the aircraft interior, pressurized air for starting the engines, electrical power, and other ground support functions.

The pits are constructed with either hinged or totally removable lids that can be moved between open positions allowing access to the pits and closed positions which are flush with the surfaces of the docking, loading, or refueling areas across which aircraft travel and beneath which the pits are mounted. To ensure that the pit lids remain flush with the surrounding surfaces it is desirable to employ a latching mechanism.

The pit access lids in such aircraft servicing pits are extremely heavy, since they must be able to withstand the weight of the wheels of a large aircraft traveling thereacross. Therefore, it is often very difficult to open such access lids without assistance.

Conventional pit access lid mounting systems sometimes employ lift assisted springs that are interconnected to the pit lid in such a way as to act in opposition to gravitational force on the lid, thereby aiding the service personnel in opening of the lid. One such spring-loaded mechanism is described, for example, in U.S. Pat. No. 5,950,368. As illustrated in that prior patent, the pit lid is mounted relative to the mouth of the pit in such a way as to be movable from an open position completely clear of any contact with the mouth of the pit, and a closed position in which a gasket about the periphery of the pit lid provides a liquid-tight seal completely about the perimeter of the mouth opening to the pit. This ensures that rain and melting snow cannot wash dirt and other debris down into the pit.

Spring assisted pit lid mounting systems have certain disadvantages, however. With age and exposure to the elements the springs can rust and break. Consequently, in some applications a gravity assisted pit lid mounting system is preferable. One such gravity assisted system that employees counterweights that are coupled to the pit lid through a system of meshed gears has been used very successfully for many years. This system is described in U.S. Pat. No. 4,467,932. However, one disadvantage of existing gravity assisted pit mounting systems is that it has not heretofore been possible to provide a liquid-tight seal for lids mounted in this manner about their entire periphery. As a consequence, there can be leakage into the pits from rain and melting snow that seeps into the mouth of the pit at the hinge opening. This is because the mounting systems for conventional gravity assisted pit lids have not heretofore provided a complete seal at the top of the pit.

SUMMARY OF THE INVENTION

The present invention provides a unique pit access lid mounting system that not only aids the user in opening the pit lid using a system of counterweights, but also a system that allows a liquid-tight seal to be established about the complete perimeter of the pit lid when the pit lid is rotated about its hinge axis to its closed position, and which provides a complete watertight seal at the top of the pit. Thus, the system of the present invention enables the use of counterweights mounted on a pair of counterweighted arms and coupled to move in counterrotation relative to a hinged pit lid and also provides such a system with a complete watertight seal at the mouth of the opening to the subsurface chamber of the pit.

One primary object of the present invention is to provide a subsurface aircraft servicing pit for use in servicing aircraft while they are on the ground which avoids the use of springs to assist the user in opening the pit lid, but which still provides the pit lid with a continuous, watertight seal about its peripheral edge when it is seated atop the mouth of the buried pit. By employing these features the disadvantages associated with the use of springs to offset the weight of the lid are avoided, but while providing a pit lid hinging arrangement that does not have a break in the watertight seal at the pit lid hinge axis. This latter feature is a disadvantage of conventional counterweighted pit lid systems.

A related object of the invention is to provide an improved subsurface aircraft servicing pit of the type used with conventional counterweighted pit lid assist systems that will accommodate an improved mounting mechanism according to the invention without changing the structure of the pit itself. Rather, the same pit that is utilized to accommodate the gearbox of a conventional gravity assisted pit lid lift mechanism is employed in the system of the present invention, but is provided with a lid seating rim assembly at the mouth of the pit with flanges that extend over the gearbox areas of the pit and seal it in watertight fashion.

To permit the pit lid to be both gravity assisted by counterweights and sealed throughout at its top, the pit lid lifting arms are reconfigured from conventional designs. Specifically, they are constructed with central U-shaped intermediate portions between their ends so as to permit them to be hinged underneath the pit rim, rather than set into upwardly facing, exposed pockets in the frame surrounding the pit lid.

A further object of the invention is to provide a counterweighted pit lid that avoids damage to the structure of the pit by the counterweights if the lid is thrown open in a violent manner. In conventional counterweighted pits it is possible for the counterweights to strike the upright wall of the pit at which the meshed counterweight gears are located with a very large force. The impact can damage the structure of the pit, if the pit lid is thrown or blown open. This can occur either due to inattention on the part of the servicing personnel, or due to the force of wind or exhaust blasts from jet airplanes in the vicinity. In either case, the structural integrity of the pit is compromised if the counterweights severely impact the wall of the pit.

Damage to the pit of the present invention is prevented by interposing a shock absorber between one or both of the counterweight arms and the wall of the pit. The shock absorbers dampen the impact of the counterweights against the pit wall, and may indeed prevent any contact at all.

In one broad aspect the present invention may be considered to be an improvement in an aircraft servicing pit defining a subsurface chamber below a surface across which aircraft travel when not airborne. The pit has at least one upright wall and an upwardly opening mouth formed by a continuous rim that has an enclosing perimeter that circumscribes and defines the mouth. A pit lid having an upper surface and an undersurface is disposed atop the mouth and hinged for rotation relative to the pit about a lid hinge axis to an open position completely free from the rim and alternatively to a closed position sealing the mouth and seated throughout the entire perimeter of the rim.

The improvement of the invention is comprised of a pair of pit lid arms supporting the pit and having distal ends that are secured to the undersurface of the pit lid at a spaced distance of separation from the lid hinge axis and proximal ends that are rotatably joined to the pit at the lid hinge axis beyond the perimeter of the rim and beneath the surface across which aircraft travel. At least one counterweight arm hinge pin is located beyond the perimeter of the rim and below the level of the surface across which aircraft travel. A pair of counterweight supporting arms each having a distal end bearing a counterweight and an opposite proximal end rotatably joined to the pit at the counterweight arm hinge pin are provided. At least one pit lid gear is rigidly secured to the proximal end of at least one of the pit lid arms. At least one counterweight gear is rigidly secured to the proximal end of at least one of the counterweight arms. The pit lid gear and the counterweight gear are meshed together. In this way the distal ends of the counterweight arms are raised as the pit lid is moved to the open position and lowered as the pit lid is moved to the closed position.

The lid supporting arms preferably both have a U-shaped configuration between their proximal and distal ends. Further, a resilient sealing loop of flexible material is disposed about the pit lid so as to reside in liquid-tight sealing engagement throughout the perimeter of the rim when the pit lid is in the closed position. The sealing loop is preferably formed of a rubber gasket and the pit lid is preferably provided with a radially directed gasket seating channel extending about its entire perimeter. The rubber gasket is entrapped in the seating channel. Preferably also, a shock absorber is interposed between at least one of the counterweight arms and the upright pit wall.

In another broad aspect the invention may be considered to be an improvement in an aircraft servicing pit buried below a surface across which aircraft travel and defining a subsurface chamber. The pit has at least one upright wall at the top of which a pit access lid capable of withstanding the weight of the tires of aircraft traveling thereacross is mounted on a lid hinge for rotation about a horizontal pit access lid axis. The aircraft servicing pit includes a gravity operated balancing mechanism having at least one counterweight located in the subsurface chamber and mounted relative to the wall by at least one counterweight arm and at least one counterweight hinge means for rotation about a counterweight axis parallel to the lid axis. At least one pair of meshed gears are provided for joining the lid and the counterweight arms for movement in counterrotation together. The counterweight or counterweights exert a rotational moment opposed to and less than the moment resulting from the weight of the lid.

According to the improvement of the invention a pair of pit lid lifting arms having distal ends fastened to the lid at locations remote from the lid axis and proximal ends hinged relative to the pit at the lid axis are rigidly secured at the lid axis to one of the meshed gears in the pair of gears. The counterweight arm is rigidly secured to the other of the gears in the pair of gears. Both the lid axis and the counterweight axis are located beneath the surface across which aircraft travel. The pit access lid is rotatable about the pit access lid axis in counterrotation with the counterweight arm between a raised, open position permitting access to the subsurface chamber and a lowered, closed position in liquid-tight sealed relation atop the subsurface chamber.

In still another aspect the invention may be considered to be an aircraft servicing pit comprising: a pit buried beneath a surface across which aircraft travel and having a mouth opening at its upper end and at least one upright wall therewithin and defining within its structure a subsurface chamber for use in servicing aircraft, an access lid, at least one hinge, and a counterweight means. The access lid is able to withstand the weight of the tires of an aircraft traveling thereacross and is located at the mouth of the pit. At least one hinge mounts the lid to the pit at the mouth thereof so that the lid is movable in rotation about a lid axis to an open position completely clear of the mouth and a closed position completely sealing the mouth throughout its perimeter with a liquid-tight seal therebetween. A counterweight means is mounted within the subsurface chamber for rotatable movement in an arcuate path relative to the upright pit wall about a counterweight axis parallel to the lid axis. A coupling means rigidly links the counterweight means to move in counterrotation with the lid The invention may be described with greater clarity and particularity by reference to the accompanying drawings.

DESCRIPTION OF THE EMBODIMENT

Figure 1:
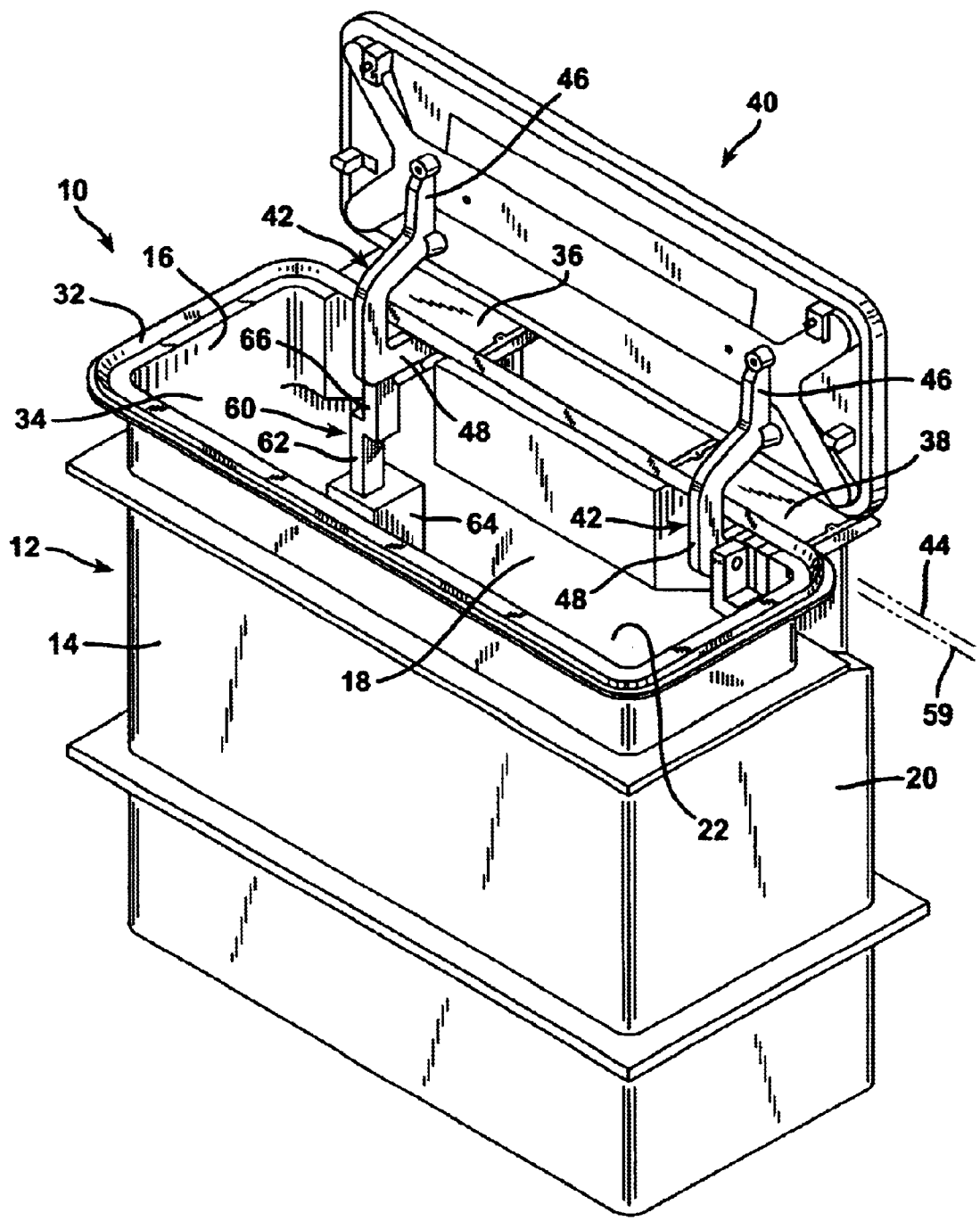
FIG. 1 is a perspective view illustrating a preferred embodiment of an improved aircraft servicing pit according to the present invention.
Figure 5:
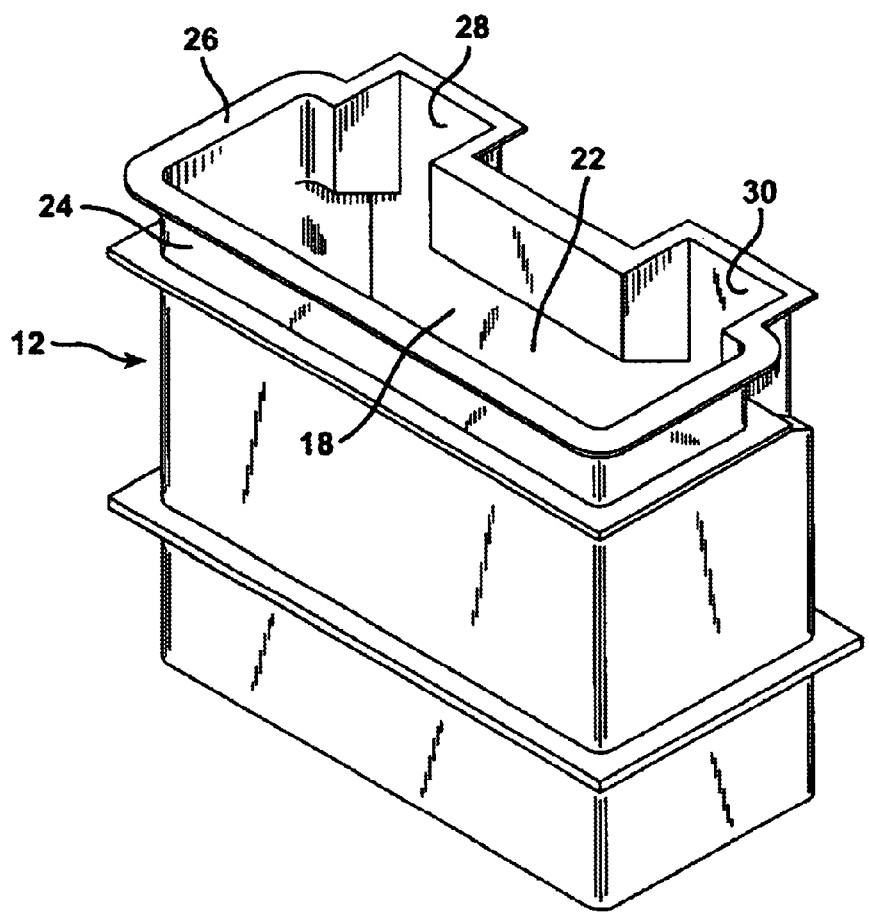
FIG. 5 is a perspective view illustrating in isolation the basic, prefabricated shell or body of the pit shown in FIG. 1.

FIG. 1 illustrates an aircraft servicing pit 10 of the type installed below a surface across which aircraft travel when not airborne. The aircraft servicing pit 10 is formed with a prefabricated, molded fiberglass resin reinforced shell or body 12 having at least one, and more typically a plurality of upright generally vertically oriented walls. The fiberglass reinforced pit body 12 is shown in isolation in FIG. 5. The molded pit body 12 has a generally rectilinear shape so that the upright walls 14, 16, 18, and 20 are oriented generally at right angles and surround and delineate a generally rectangularly shaped subsurface enclosure indicated generally at 22. At its upper extremity the pit body 12 has a neck end 24 that terminates in an outwardly directed horizontal flange 26. At its rear upright wall 18 the fiberglass pit body 12 is formed with a pair of hinge pocket openings 28 and 30.

The subsurface fiberglass pit 10 is also provided with a continuous metal rim 32 that is formed with an enclosing perimeter of rectangular shape with rounded corners to circumscribe, encompass, and define a mouth opening 34 to the pit enclosure 22. A flat, generally rectangular rubber sealing gasket 33 is interposed between the rim 32 and the upper flange 26 of the pit body 12. The aircraft servicing pit 10 is further provided with a pair of flat, horizontal metal hinge pocket cover plates 36 and.38 that project rearwardly behind the rim 32 above the upright rear pit wall 18. The plates 36 and 38 are each encompassed within a generally rectangular frame 37. The frames 37 have inwardly projecting tabs 41 that fit into corresponding depressions in the upper faces of the plates 36 and 38 at spaced intervals about the peripheries of each of the plates 36 and 38. Bolts 35 secure the tabs 41 to the cover plates 36 and 38.

The frames 37 have peripheral flanges 43 that are flush with the undersurfaces of the plates 36 and 38. The frames 37 extend completely about each of the plates 36 and 38 and the flanges 43 thereof extend from and are bolted to three sides thereof to the portions of the pit body flange 26 that extend about the hinge pockets 28 and 30. The flat gasket 33 is configured to follow the shape of the upper pit body flange 26 so that it is interposed and compressed between the flange 43 and the areas of the pit body flange 26 adjacent the hinge pockets 28 and 30. The fourth sides 51 of both of the frames 37 lie adjacent the rim 32 and are sealed thereto with a liquid-tight silicone sealant, indicated at 39.

Figure 2:
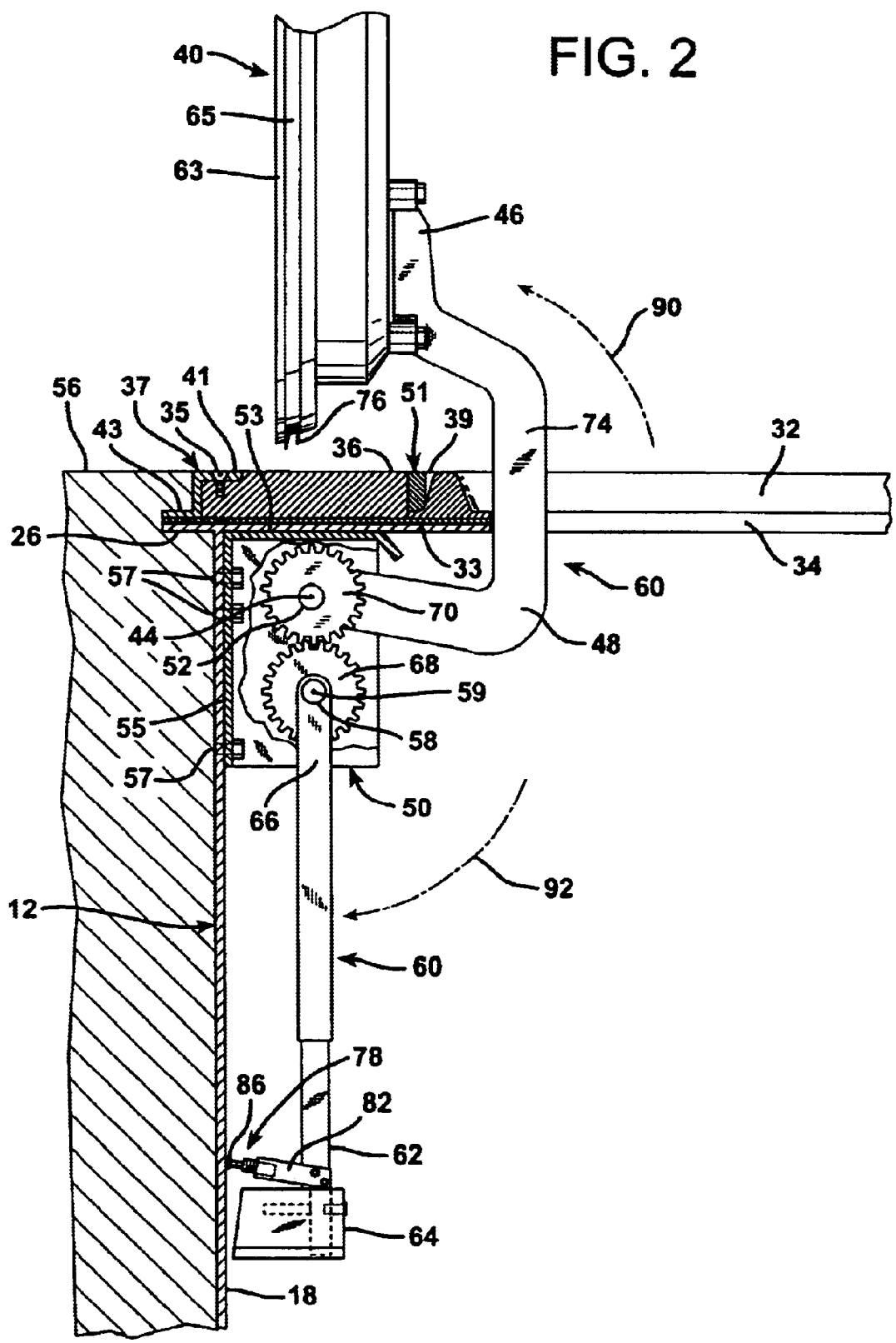
FIG. 2 is a side sectional elevational detail illustrating a portion of the counterweighted pit lid of the invention with the lid in a raised, open position.

The aircraft servicing pit 10 is also equipped with a generally flat pit access lid 40 having a generally rectangular-shaped configuration with rounded corners. The pit lid 10 is of a size and shape that conforms to the mouth opening 34 of the aircraft servicing pit 10. The pit lid 40 is mounted atop the pit body 12 by a pair of lid lifting arms 42 that hinge the pit lid 40 for rotation relative to the prefabricated pit body 12 adjacent and relative to the upright wall 18 about a hinge lid axis of rotation 44. The pit lid 40 is rotatable about the lid hinge axis 44 to an open position completely free from and out of contact with the rim 32, as illustrated in FIGS. 1 and 2, and alternatively to a closed position illustrated in FIG. 3. In the closed position the lid 40 seals the mouth opening 34 of the pit enclosure 22 and is seated throughout and nested within the entire surrounding perimeter of the rim 32.

Each of the pit lid lift arms 42 is formed with a distal end 46 that is secured to the undersurface of the pit lid 40 at a spaced distance of separation from the lid binge axis 44 and a proximal end 48. The proximal ends 48 of the pit lid lift arms 42 are rotatably joined to the upright wall 18 at the lid hinge axis 44. Each proximal end 48 is rotatably mounted to the prefabricated pit body 12 by means of separate lid hinge pins 52 that reside directly beneath the undersides of each of the plates 36 and 38. The horizontally oriented hinge pins 52 extend parallel to the rear pit wall 18 and are located within the hinge pockets 28 and 30. The hinge pins 52 extend laterally in directions opposite each other into separate gear boxes 50.

Figure 3:
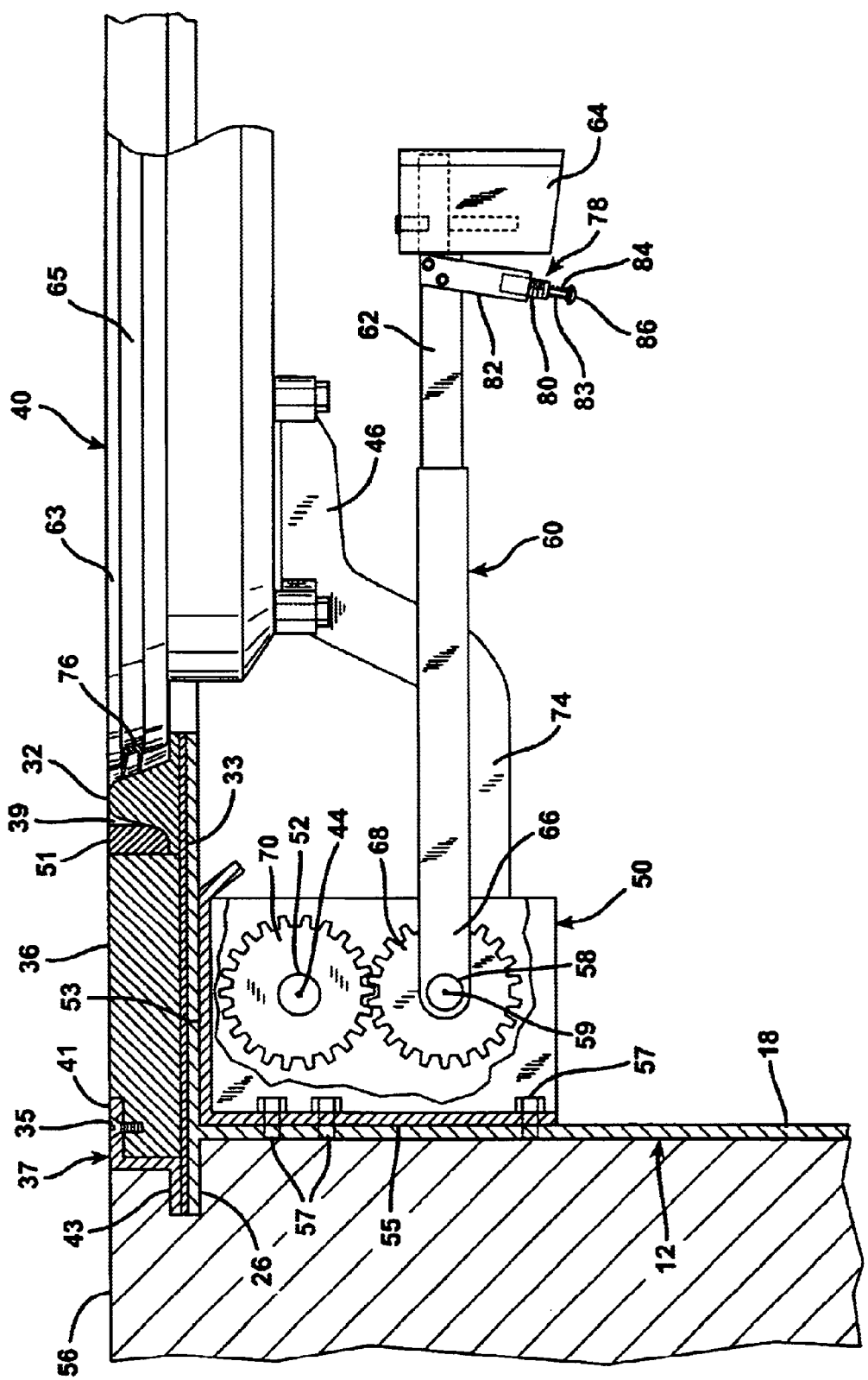
FIG. 3 is a side sectional elevational detail illustrating the portion of the pit lid depicted in FIG. 2, shown in a closed position.
Figure 4:
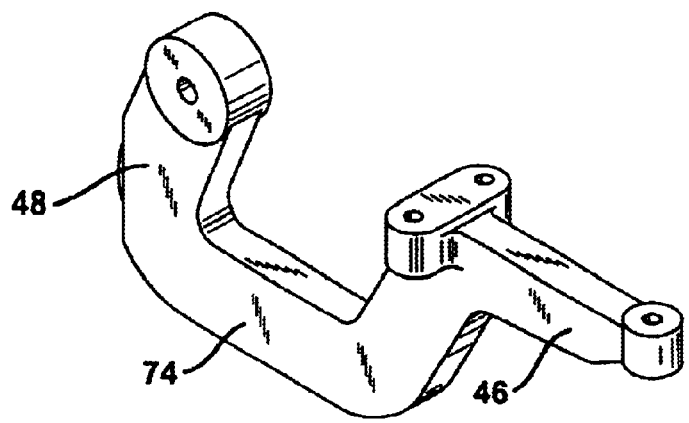
FIG. 4 is a perspective detail illustrating one of the pit access lid lifting arms in isolation.

The facing wall of the gear box 50 is shown partially broken away in FIGS. 2 and 3 to allow illustration of the gears 68 and 70 therewithin. Each of the gear boxes 50 is equipped with a horizontally oriented top flange 53 and a vertically oriented mounting flange 55. The vertically oriented mounting flanges 55 are secured by bolts 57 to the rear pit wall 18 at the hinge pockets 28 and 30, so that one gear box 50 is located in the flange pocket 28 while the other is located in hinge pocket 30.

The pit lid lift arms 42 are located on the inboard sides of the hinge pockets 28 and 30 so that the hinge pins 52 extend in an outboard direction through openings in the walls of the gear boxes 50 and into the enclosures of the gear boxes 50. The hinge pins 52 are rigidly secured to the proximal ends 48 of the pit lid arms 42. The hinge pins 52 reside some distance beneath the hinge pocket cover plates 36 and 38, beneath the surface 56 across which the wheels of aircraft roll, and beyond the perimeter of the mouth opening 34 of the subsurface pit 10 defined within the confines of the rim 32. The hinge pins 52 that mount the proximal ends 48 of the pit lid arms 42 are coaxially aligned and define the hinge lid axis 44.

Because the proximal ends 48 of the pit lid arms 42 are mounted for rotation beneath the rearwardly projecting hinge pocket cover plates 36 and 38, the hinge lid axis 44 is located laterally beyond the perimeter of the rim 32, outside of the mouth opening 34, and beneath the level of the rim 32 and surface 56 across which aircraft travel and beneath which the aircraft servicing pit 10 is buried.

The aircraft servicing pit 10 is provided with at least one, and preferably a pair of counterweight arm hinge pins 58, also located laterally beyond the perimeter of the rim 32 and beneath the surface 56 across which aircraft travel. The counterweight hinge pins 58 are directed toward each other in an inboard direction to extend into openings in the walls of the gear boxes 50 from the direction opposite the hinge pins 52. The counterweight arm hinge pins 58 also extend into the enclosures of the gear boxes 50 beneath the undersides of the cover plates 36 and 38 and beneath the level of the hinge pins 52.

A pair of counterweight supporting arms 60 are provided. Each of the counterweight supporting arms 60 has a distal end 62 bearing a counterweight 64 and an opposite proximal end 66 rotatably joined to the body 12 of the pit 10 at one of the counterweight arm hinge pins 58. The counterweight arm hinge pins 58 are rigidly secured to their respective counterweight supporting arms 60 and are coaxially aligned with each other. The counterweight hinge pins 58 define a horizontal counterweight arm axis of rotation 59 that is proximate and parallel to the lid hinge axis of rotation 44, and located immediately therebeneath.

At least one of the counterweight supporting arms 60 must be provided with a counterweight gear 68. In the preferred embodiment of the invention, both of the counterweight supporting arms 60 are provided with counterweight gears 68 and both of the pit lid supporting arms 42 are provided with pit lid gears 70. The counterweight gears 68 are rigidly secured to the counterweight hinge pins 58 which in turn are rigidly secured to the proximal ends 66 of the counterweight supporting arms 60.

The proximal end 48 of each pit lid arm 42 is provided with a pit lid gear 70. Each pit lid gear 70 is rigidly secured to the proximal end 48 of its associated pit lid arm 42, while the counterweight gear 68 is rigidly secured to the proximal end 62 of its associated counterweight arm 60. Each pit lid gear 70 is meshed with a corresponding counterweight gear 68 located immediately therebeneath as shown in FIGS. 2 and 3. As illustrated in those drawing figures, the distal ends 62 of the counterweight arms are raised as the pit lid 40 is moved to the closed position illustrated in FIG. 3, and lowered as the pit lid 40 is moved to the open position, illustrated in FIGS. 1 and 2.

The operation of the counterweights 64, the counterweight arms 60 and the meshed gear arrangement of the counterweight gears 68 and the pit lid gears 70 and the interaction of the counterweight means with the pit lid 40 is the same as depicted and described in prior U.S. Pat. No. 4,467,932, which is hereby incorporated by reference in its entirety. However, the manner in which the pit lid 40 and the counterweight means is mounted in the pit 10 differs in some important respects.

Specifically, both the counterweight axis of rotation 59 and the pit lid axis of rotation 44 are located beneath the level of the frame formed by the rim 32 within which the pit lid 40 is seated. As a consequence, the lid hinge and counterbalancing mechanisms can be sealed liquid tight beneath the surface 56 by the flat gasket 33. There is no opening at the upper surface 56 beyond the mounting frame of the rim 32 where the pit hinge mechanism is located. Quite to the contrary, both the pit lid hinge mechanism and the counterweight arm mounting mechanism are located below the level of the rim, 32 within the confines of the pit enclosure 22 and laterally beyond the perimeter of the enclosure mouth 34 defined therewithin. The flat hinge pocket cover plates 36 and 38 located at the rear of the rim 32 over the hinge pockets 28 and 30, respectively, are sealed watertight to the regions of the pit body flange 26 around the hinge pockets 28 and 30 by the gasket 33 that is compressed between clamping bolts (not shown) that join the cover clamping frames 37 to the pit body flange 26.

The elimination of a surface opening where the pit lid 40 is hinged is possible due to the construction of the pit lid lift arms 42. More specifically, the intermediate portions 74 of the pit lid lift arms 42 between the proximal ends 48 and distal ends 46 both have a U-shaped configuration. By utilizing pit lid lift arms 42 having this configuration, it is possible for the lid hinge mechanism to be totally isolated within the pit enclosure 22 by sealing the hinge pockets 28 and 30 of the prefabricated pit shell 12 with the hinge pocket cover plates 36 and 38.

By locating the pit lid hinge mechanism completely within the confines of the pit enclosure 22, and by connecting the distal ends 46 of the pit lid lift arms 42 to the underside of the pit lid 40 at a location set in from and laterally displaced from the perimeter of the pit lid 40, it is possible to equip the peripheral edge of the pit lid 40 with a sealing gasket 76 comprised of a resilient, sealing loop of flexible material disposed entirely about the peripheral circumference of the peripheral edge 63 of the pit lid 40. The gasket 76 is preferably of the construction depicted and described in prior U.S. Pat. No. 5,950,368, which is also incorporated by reference herein in its entirety. The gasket 76 is shown in section in FIGS. 2 and 3 and is formed as an encircling, endless loop of rubber material set into a peripherally outwardly directed channel 65 formed in the outer peripheral edge 63 of the pit lid 40. The gasket seating channel 65 extends about the entire periphery of the edge 63 of the lid 40 and the rubber gasket 76 is entrapped in the seating channel 65 and completely surrounds the pit lid edge 63 in a continuous, unbroken band.

With this arrangement it is evident that when the pit lid 40 is closed to its seated position illustrated in FIG. 3, the rubber gasket 76 contacts the rim 32 throughout their mutual, continuous interface, thereby providing a liquid-tight seal at the mouth opening 34 of the pit 10.

A further feature of the invention is the provision of a shock absorber 78 on each of the counterweight supporting arms 60. The particular shock absorber mechanism employed may be the same as that utilized in prior U.S. Pat. No. 5,950,368. Specifically, each shock absorber 78 is formed with an externally threaded barrel 80 that is screwed into an internally tapped bore in a mounting bracket 82 that projects laterally from the distal end 62 of each of the counterweight supporting arms 60. Each shock absorber 78 is provided with a piston entrapped within the barrel 80 and having a piston rod 83 that is urged outwardly from the barrel 80 by means of a spring 84 disposed coaxially about the piston rod 83. The spring 84 bears against the underside of a cushioning head 86 attached to the exposed end of the piston rod 83.

As the pit lid 40 is opened by pulling upwardly thereon at a handgrip provided in the upper surface of the pit lid remote from the lid hinge axis of rotation 44, the gravitational force acting upon the counterweights 64 through the meshed gears 68 and 70 provides a very substantial force that aids the user in swinging the pit lid 40 from the closed position shown in FIG. 3 to the fully open position illustrated in FIG. 2. In fact, the force urging the pit lid 40 and the counterweights 64 in counterrotation, as illustrated by the directional arrows 90 and 92 in FIG. 2, may be so great as to create a damaging impact of the counterweights 64 against the upright wall 18 of the prefabricated pit body 12. However, by providing each of the counterweight arms 60 with a shock absorber 78 as depicted and described, this impact is cushioned by contact of the cushioning heads 86 of the shock absorbers 78 with the upright wall 18, followed by compression of the springs 84. The cushioning effect created thereby minimizes any impact against the upright wall 18 due to counterrotation of the counterweight arms 60 in the direction indicated by the directional arrow 92 in FIG. 2. The shock absorbers 78 also preferably serve as spacers that prevent any direct contact between the counterweights 64 and the upright interior pit wall 18.

Undoubtedly, numerous variations and modifications of the invention will become readily apparent to those familiar with subsurface aircraft servicing pits of the type utilized for servicing aircraft on the ground. Accordingly, the scope of the invention should not be construed as limited to the specific embodiment depicted and described, but rather is defined in the claims appended hereto.

I claim:

1. In an aircraft servicing pit defining a subsurface chamber below a surface across which aircraft travel when not airborne having at least one upright wall and an upwardly opening mouth formed by a continuous rim that has an enclosing perimeter that circumscribes and defines said mouth, and including a pit lid having an upper surface and an undersurface disposed atop said mouth and hinged for rotation relative to said upright wall about a lid hinge axis to an open position completely free from said rim and alternatively to a closed position sealing said mouth and seated throughout said entire perimeter of said rim, the improvement comprising:

a pair of pit lid arms supporting said pit lid and having distal ends that are secured to said undersurface of said pit lid at a spaced distance of separation from said lid hinge axis and proximal ends that are rotatably joined to said upright wall at said lid hinge axis beyond the perimeter of said rim and beneath said surface across which aircraft travel, at least one counterweight arm hinge pin located beyond said perimeter of said rim and beneath the level of said surface across which aircraft travel, a pair of counterweight supporting arms each having a distal end bearing a counterweight and an opposite proximal end rotatably joined to said pit at said at least one counterweight arm hinge pin, at least one pit lid gear rigidly secured to said proximal end of at least one of said pit lid arms, at least one counterweight gear rigidly secured to said proximal end of at least one of said counterweight arms, and said pit lid gear and said counterweight gear are meshed together, whereby said distal ends of said counterweight arms are raised as said pit lid is moved to said closed position and lowered as said pit lid is moved to said open position.

2. An aircraft servicing pit according to claim 1 wherein said lid arms both have a U-shaped configuration between their proximal and distal ends.

3. An aircraft servicing pit according to claim 1 further comprising a resilient, sealing loop of flexible material disposed about said pit lid so as to reside in liquid-tight sealing engagement therewithin throughout said perimeter of said rim when said pit lid is in said closed position.

4. An aircraft servicing pit according to claim 3 wherein said sealing loop is formed of a rubber gasket and said pit lid is provided with an outwardly directed gasket seating channel extending about its entire periphery and said rubber gasket is entrapped in said seating channel.

5. An aircraft servicing pit according to claim 1 further comprising a shock absorber interposed between at least one of said counterweight arms and said upright pit wall.

6. In an aircraft servicing pit buried below a surface across which aircraft travel and defining a subsurface chamber and having at least one upright wall at the top of which a pit access lid capable of withstanding the weight of the tires of an aircraft traveling thereacross is mounted on a lid hinge for rotation about a horizontal pit access lid axis, and including a gravity operated balancing mechanism having at least one counterweight located in said subsurface chamber and mounted relative to said wall by at least one counterweight arm and at least one counterweight hinge means for rotation about a counterweight axis parallel to said pit access lid axis, and a pair of meshed gears for joining said lid and said counterweight arm for movement in counterrotation together, whereby said at least one counterweight exerts a rotational moment opposed to and less than the moment resulting from the weight of said lid, the improvement comprising a pair of pit lid lifting arms having distal ends fastened to said lid at locations remote from said pit access lid axis and proximal ends hinged relative to said pit at said pit access lid axis and rigidly secured at said pit access lid axis to one of said meshed gears in said pair of gears, and at least one counterweight arm is rigidly secured to the other of said gears in said pair of gears, and both said pit access lid axis and said counterweight axis are located beneath said surface across which aircraft travel, and said pit access lid is rotatable about said pit access lid axis in counterrotation with said counterweight arm between a raised, open position permitting access to said subsurface chamber and a lowered, closed position in liquid-tight sealed relation atop said subsurface chamber.

7. An aircraft servicing pit according to claim 6 further comprising a shock absorber mounted on said counterweight arm, and said shock absorber cushions impact of said counterweight relative to said upright wall of said pit when said pit access lid is rotated to said open position.

8. An aircraft servicing pit according to claim 7 wherein said pit is provided with an access mouth at its upper extremity defined by a continuous, closed rim completely circumscribing said mouth, and said pit access lid has an outer periphery with a continuous, resilient sealing gasket extending thereabout in a loop, and said sealing gasket contacts said rim throughout when said pit access lid is in said closed position, to thereby formed a liquid-tight seal between said gasket and said rim.

9. An aircraft servicing pit according to claim 8 wherein said counterweight axis and said lid axis and are both located mutually adjacent and parallel to each other beneath said surface across which said aircraft travels and laterally beyond said rim.

10. An aircraft servicing pit according to claim 9 wherein said pit lid lifting arms include intermediate portions each formed in a U-shaped configuration between their proximal and distal ends.

11. An aircraft servicing pit according to claim 7 wherein said shock absorber may be adjusted in its location on said counterweight arm to extend a selected distance therefrom in a direction toward said upright wall.

12. An aircraft servicing pit comprising:

a pit buried beneath a surface across which aircraft travel and having a mouth opening at its upper end and at least one upright wall therewithin, and defining within its structure a subsurface chamber for use in servicing aircraft, an access lid that is able to withstand the weight of the tires of an aircraft traveling thereacross located at said mouth of said pit, at least one hinge mounting said lid to said pit at said mouth thereof so that said lid is movable in rotation about a lid axis to an open position completely clear of said mouth and a closed position completely sealing said mouth throughout its perimeter with a liquid-tight seal therebetween, counterweight means mounted within said subsurface chamber for rotatable movement in an arcuate path relative to said upright pit wall about a counterweight axis parallel to said lid axis, and coupling means rigidly linking said counterweight means to move in counterrotation with said lid.

13. An aircraft servicing pit according to claim 12 wherein said counterweight means is comprised of a pair of counterweight arms and a pair of counterweights attached to said counterweight arms at a selected distance from said coupling means, and further comprising a shock absorber interposed between said counterweight arms and said upright wall of said pit.

14. An aircraft servicing pit according to claim 13 wherein said pit lid is provided with a resilient loop of gasket material about its periphery that creates said liquid-tight seal at said mouth.

15. An aircraft servicing pit according to claim 14 wherein said periphery of said pit lid is equipped with a radial channel to receive said loop of gasket material.

16. An aircraft servicing pit according to claim 15 further comprising a pair of pit lid arms having proximal ends forming said hinge and joined to said coupling means and distal ends secured to said pit lid at its underside at locations remote from said hinge and within perimeter of said pit and said pit lid arms have a U-shaped configuration between their proximal and distal ends.

* * * * *